INVENTOR.
GARY A. MESSERLY
WAYNE H. ROYER
WILLIAM H. GILGORE

Otto Moeller

Aug. 6, 1968  G. A. MESSERLY ET AL  3,395,653

BAKING OVENS AND PRODUCT LOADING AND UNLOADING MEANS THEREFOR

Filed March 22, 1966  5 Sheets-Sheet 3

INVENTOR.
GARY A. MESSERLY
WAYNE H. ROYER
WILLIAM H. GILGORE

Otto Maeller

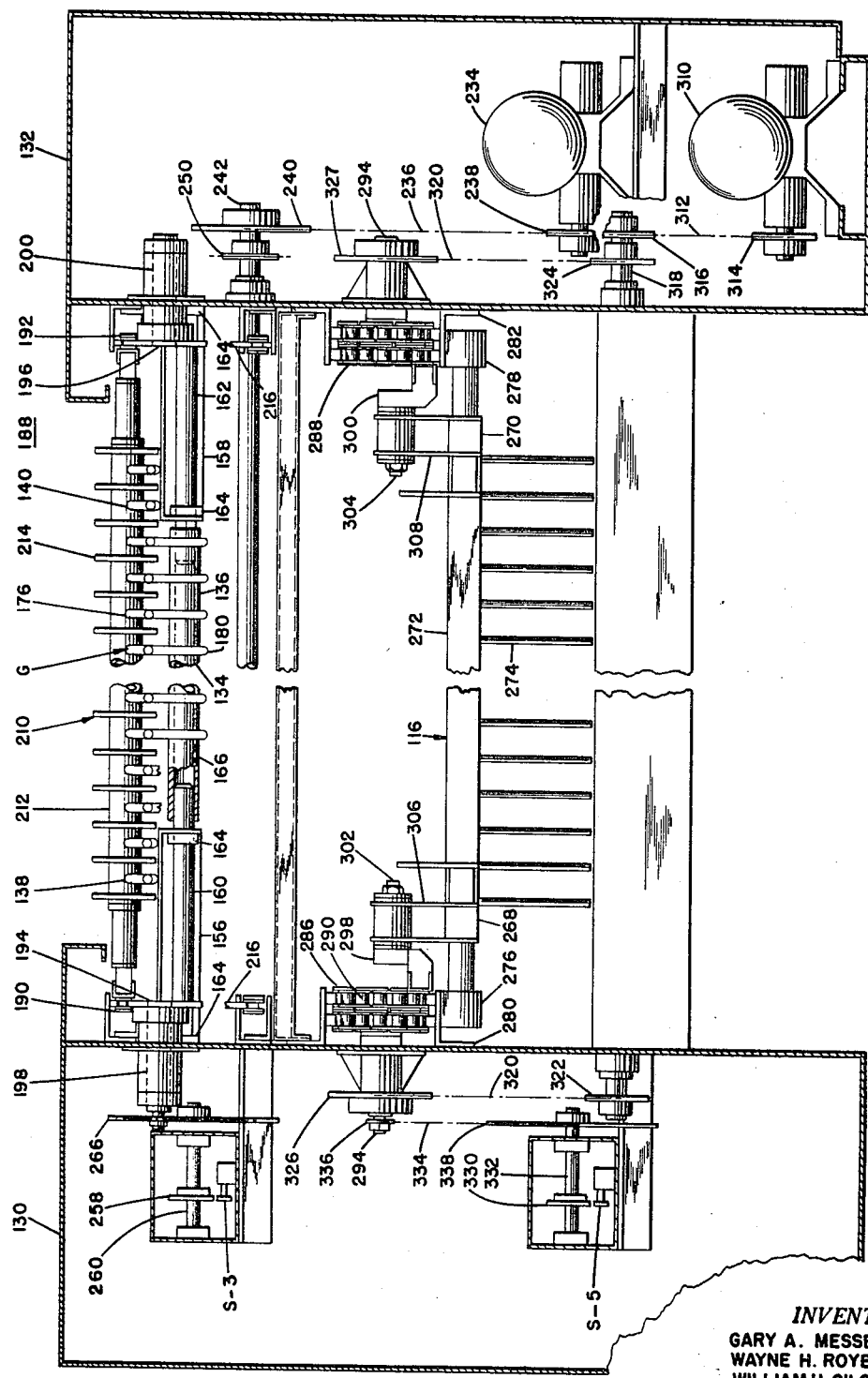

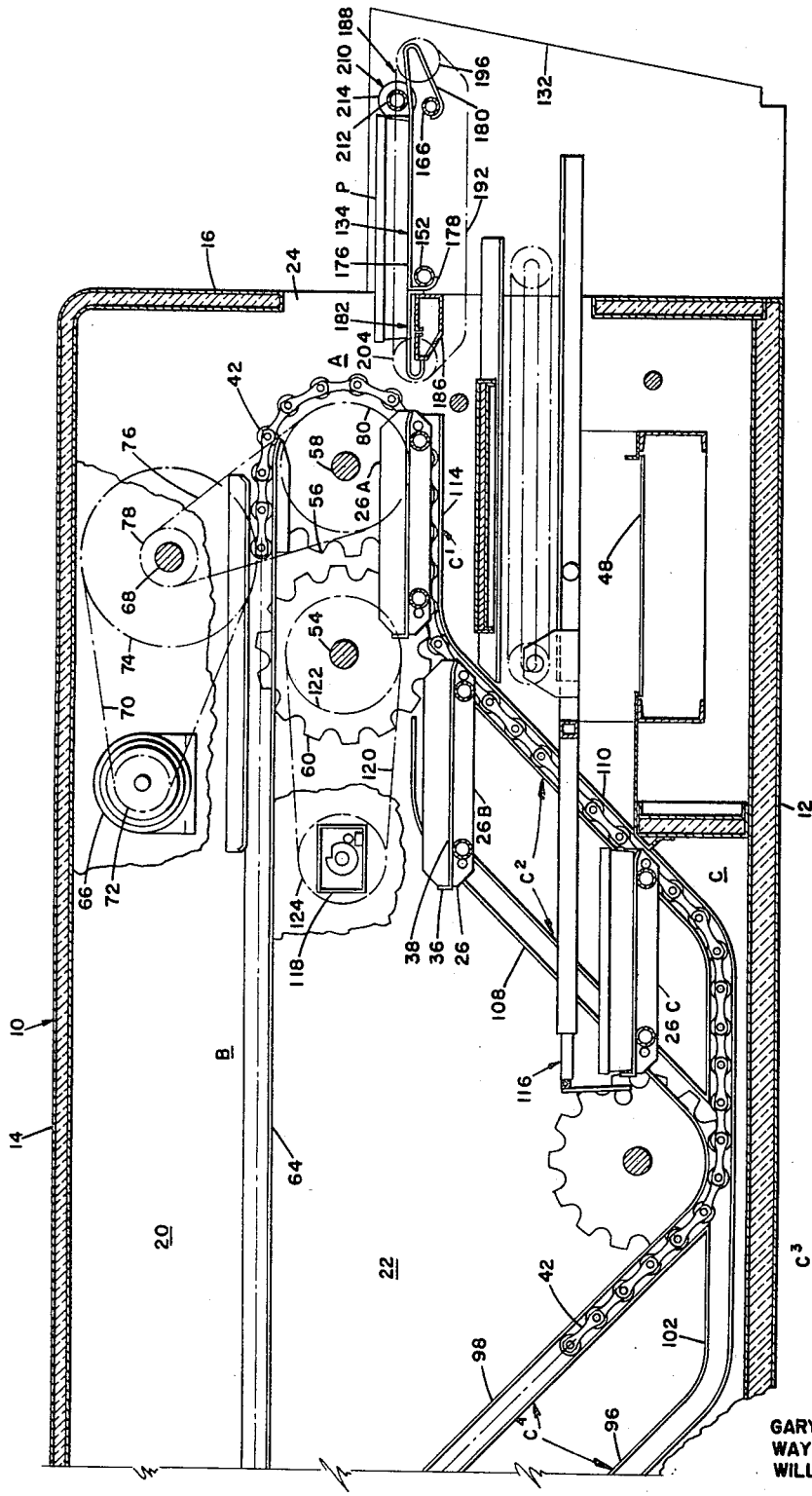

United States Patent Office 3,395,653
Patented Aug. 6, 1968

3,395,653
BAKING OVENS AND PRODUCT LOADING AND UNLOADING MEANS THEREFOR
Gary A. Messerly and Wayne H. Royer, York, and William H. Gilgore, Hellam, Pa., assignors to Read Corporation, a corporation of Delaware
Filed Mar. 22, 1966, Ser. No. 536,372
12 Claims. (Cl. 107—57)

ABSTRACT OF THE DISCLOSURE

An apparatus for mechanical level plane loading and for mechanical level plane unloading of products on successive trays of a traveling tray type oven. The loader is mounted outside and adjacent the front of the oven for loading product onto a tray alined therewith and the unloader is mounted inside the oven adjacent the front of the oven below the level of the loader for unloading product from a tray alined therewith. The loader is supported on a normally horizontal drop shelf hingedly mounted for selectively swinging the same together with the loader to a vertical position adjacent the front of the oven. The loader and unloader are rendered selectively operative or immobilized by separate motors whereby to provide selective simultaneous mechanical loading and unloading of two separate trays when both motors are energized, manual loading and mechanical unloading two separate trays when the drop shelf is swung to its vertical position and the loader motor is de-energized, and manual loading and unloading of the same tray when both motors are de-energized and when the drop shelf is swung to its vertical position.

---

This invention relates to commercial type baking ovens of the traveling tray conveyor type equipped with means for mechanical level plane loading of successive rows of pans of products to be baked onto successive oven trays and for mechanical level plane unloading of rows of pans of baked products from successive oven trays.

Prior mechanical level plane loader and unloader equipped ovens have not been entirely satisfactory or desirable for handling the variety of baked products of a variety bakery, that includes besides bread such baked goods as cookies, buns, cakes of all descriptions, soft filled as well as other pies and other products. In fact, it is common for a bakery to have several ovens for handling different types of products. An important object of the present invention is to provide a level plane loader and unloader equipped oven that is conveniently and expeditiously converted by the operator in practically no time at all and with no tools, or physical removal or replacement of parts, for mechanical loading and mechanical unloading of products, for manually loading products directly onto the oven trays and manually unloading the products from the trays where the products are of such nature that they are required or desired to be manually loaded and unloaded, and for manually loading the products directly onto the oven trays and mechanically unloading the products from the trays where the products are such as are required or desired to be manually loaded but that when baked can be mechanically unloaded.

Another object is to provide apparatus of the type just described, wherein the various kinds of products to be handled by the oven may be introduced in any desired sequence.

A further object is to provide apparatus of the type just described, wherein introduction of one variety of product may closely follow introduction of another variety.

A further object is to provide a new and improved level plane loader particularly adapted to push even the shallowest of pans across a loading shelf onto successively alined trays of a traveling tray conveyor oven.

Still another object is to provide a new and improved level plane loader in which the pusher member of the loader upon completing its pan pushing stroke returns beneath the loading shelf on its way to its position to engage a succeeding row of pans, and that is constructed and arranged to eliminate catching and tilting of even the shallowest of pans as it descends at the end of its pushing stroke into position for its return stroke beneath the loading shelf and to eliminate catching and tilting of the pans as it engages a row of pans on its pan pushing stroke.

These and other objects and advantages of the invention and the manner in which they are realized will become apparent from the following description which, considered in connection with the accompanying drawings, sets forth the preferred embodiment of the invention.

In the drawings:

FIGURE 4 is an enlarged front end elevation of FIGURE 1;

FIGURE 5 is a longitudinal vertical sectional view through the front end of the oven, loader and unloader looking toward the side of the oven opposite that of FIGURE 1;

FIGURE 8 is a fragmentary wiring diagram showing the circuits and switches controlling the tray conveyor motor, the loading pusher motor and the unloading rake motor.

Figure 1:
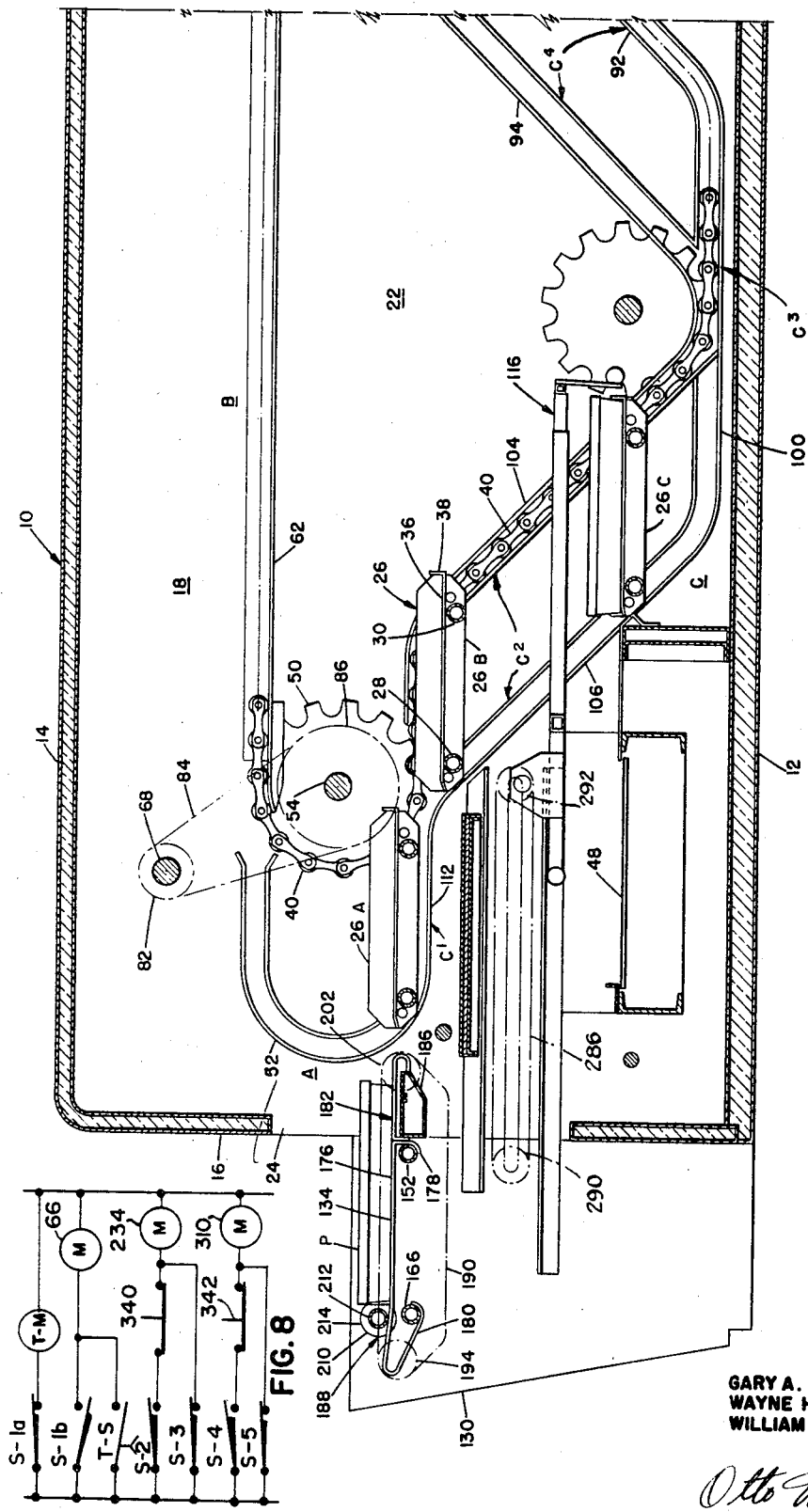
FIGURE 1 is a longitudinal vertical sectional view through the loader and unloader and the forward portion of the oven to which they are applied, parts being shown in elevation.

Referring to the drawings, the numeral 10 designates a commercial type baking oven of generally longitudinally elongated rectangular configuration, only so much thereof being shown as is necessary to a complete understanding of the invention. The oven includes a base 12, a top wall 14, a front wall 16, side walls 18 and 20, and a rear wall (not shown) enclosing a baking chamber 22. Facing the front of the oven 10, the side wall 18 is shown at the left and the side wall 20 is shown at the right, and for convenience in locating the various elements of the invention, the side wall 18 will be referred to as the left side wall with that side of the oven adjacent thereto being referred to as the left side of the oven, and the side wall 20 will be referred to as the right side wall with that side of the oven adjacent thereto being referred to as the right side of the oven. In usual manner, the walls of the oven include inner and outer spaced sheets between which suitable insulating material is interposed, and between which drive elements and other appurtenances may also be accommodated.

The front wall 16 is provided with a transversely elongated loading opening 24 through which successive rows of transversely adjacent pans P of dough products to be baked are delivered into successive trays 26 that are arranged to be transported in a closed loop through the baking chamber 22 by conveying means hereinafter described in detail. Under certain conditions of operation, which will be hereinafter described in detail, the loading opening 24 may also serve as an unloading opening through which the pans of baked dough products may be removed from successive oven trays 26.

The trays 26 may be of any suitable well known type and, as illustrated, are of generally rectangular shape, comprising a pair of transversely extending, longitudinally spaced tubular frame members 28 and 30, a pair of longitudinally extending side frame members 32 and 34 secured in suitable manner to and connecting the ends of the tubular members 28 and 30, and a grid type pan supporting shelf 36 made up of a plurality of longitudinally extending laterally spaced rods 38 secured in suitable manner to the tubular frame members 28 and 30.

Figure 2:
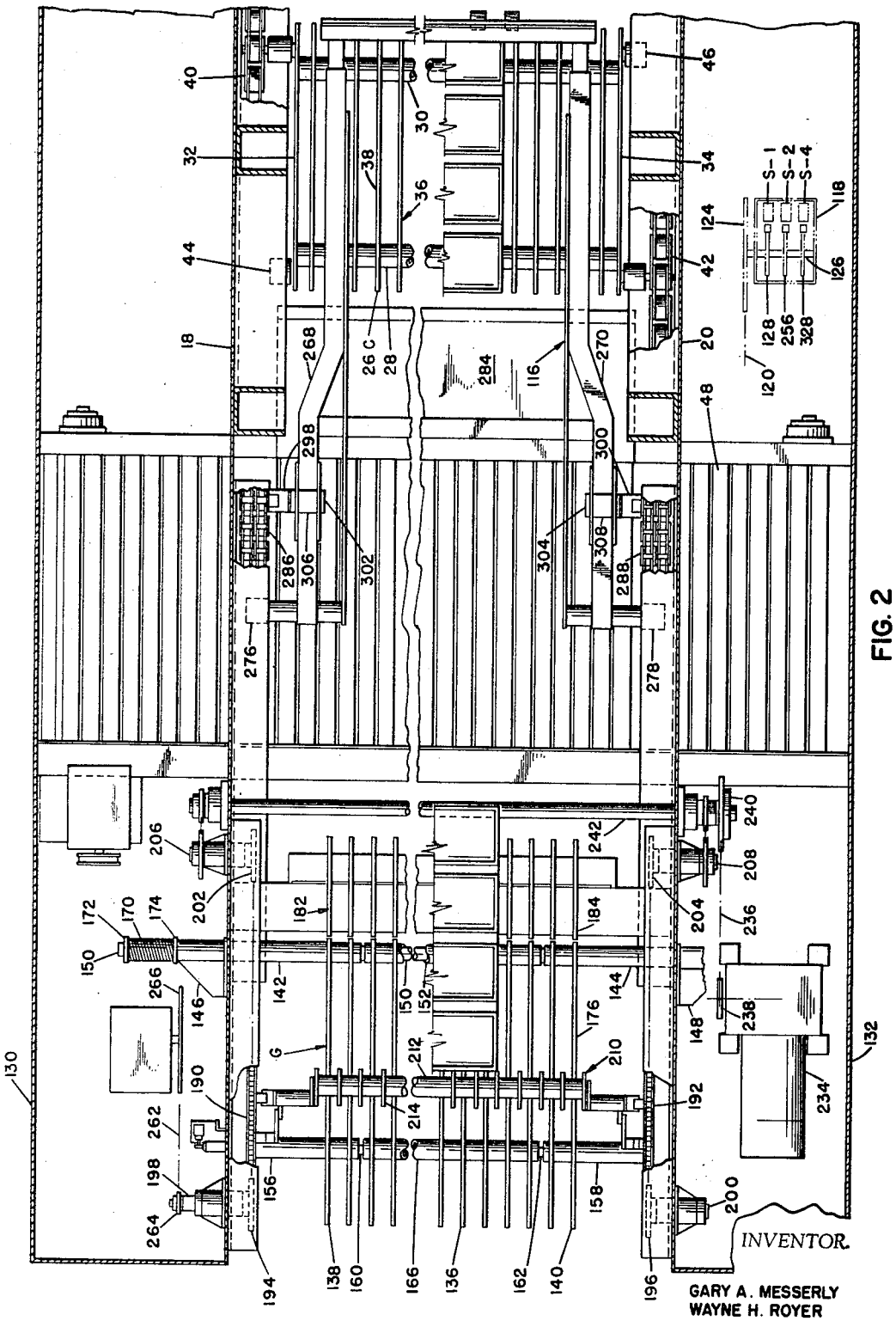
FIGURE 2 is a sectional plan view on an enlarged scale taken on line 2—2 of FIGURE 1.
Figure 7:
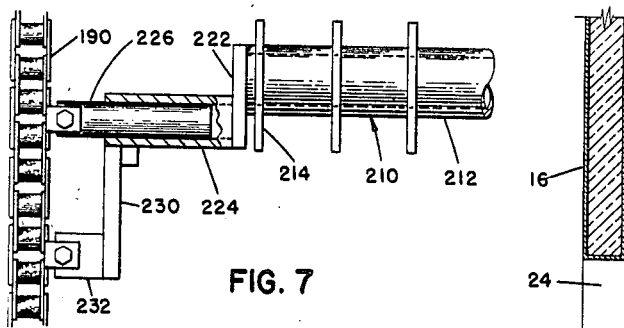
FIGURE 7 is a plan view of FIGURE 6 with parts broken away and shown in section.

Each of the trays 26 is pivotally connected at two diagonally opposite corners to the endless chains 40 and 42, arranged to convey the trays 26 in an endless path through the oven baking chamber 22. The trays 26 are spaced apart with their connections to the chains 40 and 42 being equidistantly spaced along the lengths of the chains. Referring particularly to FIGURE 2, the rear left corner of each tray 26 is pivotally connected to the endless chain 40 which is disposed at the left side of the oven, and the front right corner of each tray 26 is pivotally connected to the endless chain 42 which is disposed at the right side of the oven. By the above described means, the trays 26 are connected with the conveyor chains 40 and 42 for movement thereby, and also for relative pivotal movement with respect thereto, so that the trays 26 may be maintained in a horizontal position, by means hereinafter described, as the conveyor chains 40 and 42 follow their circuitous path through the oven baking chamber 22.

The diagonally opposite left front and right rear corners of the trays 26 are not connected with the conveyor chains 40 and 42, but carry outboard rollers 44 and 46. Certain sprockets and guide tracks, to be described, adapted to be engaged by the conveyor chains 40 and 42 and outboard rollers 44 and 46 provide for and stabilize the trays 26 along an upright tray conveyor run A adjacent the oven front wall past the loading opening 24, then along a horizontal upper tray conveyor run B to the rear of the oven, and then along a lower tray conveyor run C.

The lower tray conveyor run C includes a short horizontal forward run portion $C^1$ spaced above the oven base 12 and a run portion $C^2$ sloping downwardly and rearwardly from the rearward end of the forward run portion $C^1$ to a point just above the oven base 12. The height of the horizontal forward run portion $C^1$ above the oven base 12 and its longitudinal extent is such that together with the sloping run portion $C^2$ a space is provided within the oven below the run portion $C^1$ and forward of the run portion $C^2$ to accommodate a transversely extending unloading conveyor 48. The lower tray conveyor run C also includes a short horizontal run portion $C^3$ extending rearwardly of the lower rearward end of sloping run portion $C^2$, from which the lower tray conveyor run C may follow any desired path to the rear of the oven preferably, as shown, along a rearward and upwardly sloping run portion $C^4$, and a horizontal rearward run portion, not shown, linearly alined with horizontal forward run portion $C^1$.

As previously set forth, the right front corners of the trays 26 are pivotally attached to the tray conveyor chain 42 at the right side of the oven and the left rear corners of the trays 26 are pivotally attached to the tray conveyor chain 40 at the left side of the oven. Therefore, to maintain the trays 26 in a horizontal plane as they travel along upright tray conveyor run A and along the sloping lower run portions $C^2$ and $C^4$, the left side tray conveyor chain 40 is offset rearwardly with respect to the right side tray conveyor chain 42 a distance equal to the longitudinal distance between the axes of the pivotal connections of a tray 26 with the chains 40 and 42.

At the upright run A of the tray conveyor, the left tray conveyor chain 40 (to which the left rear corners of the trays 26 are pivotally attached) is trained around a sprocket 50, and the left front outboard tray rollers 44 are arranged to ride in a semicircular guide track 52. The sprocket 50 is fixed on a transversely extending through shaft 54 suitably journaled in bearings carried by the inner sheets of the oven side walls 18 and 20, and the guide track 52 is suitably secured to the inner sheet of oven side wall 18. The right tray conveyor chain 42 (to which the right front corners of the trays 26 are pivotally attached) is trained around a sprocket 56 fixed on a stub shaft 58 disposed in traverse axial alinement with the center of curvature of the guide 52, the stub shaft 58 being suitably journaled in a bearing carried by the inner sheet of oven side wall 20. The right rear outboard tray rollers 46 are arranged to engage a sprocket 60 fixed on through shaft 54. The above arrangement of sprockets and guides stabilize and retain the trays 26 in horizontal position as they traverse upright run A.

Suitable longitudinally extending guide tracks 62 secured to the inner sheet of side wall 18 and similar guide tracks 64 secured to the inner sheet of side wall 20, are arranged to be engaged by tray conveyor chains 40 and 42 and by the tray outboard rollers 44 and 46 for supporting and stabilizing the trays as they traverse tray conveyor run B.

The means for driving the tray conveyor chains 40 and 42 includes a reduction gear head motor 66 suitably mounted at the right side of the oven between the inner and outer sheets of oven side wall 20. A transversely extending jack shaft 68 disposed above the forward end of the tray conveyor run B and suitably journaled in bearings carried by the inner sheets of oven side walls 18 and 20, is driven from motor 66 by sprocket chain 70 trained over a sprocket 72 fixed on the output shaft of motor 66 and a sprocket 74 fixed on the jack shaft 68 between inner and outer sheets of oven side wall 20. The stub shaft 58 is driven from the jack shaft 68 by a sprocket chain 76 which is trained over a sprocket 78 fixed on the jack shaft 68 between inner and outer sheets of oven side wall 20 and also trained over a sprocket 80 fixed on the stub shaft 58 between inner and outer sheets of oven side wall 20. The tray conveyor chain 42 is driven from the stud shaft 58 since, as previously described, it is trained around the sprocket 56 which is fixed on the stub shaft 58. Also fixed on the jack shaft 68, between the inner and outer sheets of oven side wall 18, is a sprocket 82. A sprocket chain 84 trained around sprocket 82 and around a sprocket 86 that is fixed on the previously described through shaft 54 between inner and outer sheets of oven side wall 18, drives the through shaft 54 from the jack shaft 68. The tray conveyor chain 40 is driven from through shaft 54 since, as previously described, it is trained around the sprocket 50 which is fixed on the through shaft 54.

Along the sloping run portion $C^4$ of the return tray conveyor run C there is provided at the left side of the oven a sloping guide track 92 and a sloping guide track 94 forwardly offset and parallel with respect to guide track 92. The left tray conveyor chain 40 is arranged to follow the rear guide track 92 and since the left rear corners of the trays are pivotally connected to the chain 40, the rear portions of the trays are constrained to follow the rear guide track 92. The left front corners of the trays being unattached to the chain 40, the outboard rollers 44 are free to follow the front guide track 94. The guide tracks 92 and 94 are suitably secured to the inner sheet of oven side wall 18. At the right side of the oven there are provided rear and front sloping guide tracks 96 and 98 transversely alined with the guide tracks 92 and 94 that are suitably secured to the inner sheet of oven side wall 20. The right tray conveyor chain 42 is arranged to follow the front guide track 98 and since the right front corners of the trays are pivotally connected to the chain 42, the front portions of the trays are constrained to follow the front guide track 98. The right rear corners of the trays being unattached to the chain 42, the outboard rollers 46 are free to follow the rear guide track 96. The guide tracks 96 and 98 are suitably secured to the inner sheet of oven side wall 20. The tracks 92 and 94 and the tracks 96 and 98 are offset a horizontal distance such that the trays 26 are maintained in horizontal position as they descend the sloping run portion $C^4$.

Suitable longitudinally extending guide tracks 100 secured to the inner sheet of side wall 18 and similar guide tracks 102 secured to the inner sheet of side wall 20, are arranged to be engaged by tray conveyor chains 40 and 42 and by the tray outboard rollers 44 and 46 for supporting the trays as they traverse the run portion $C^3$ of the lower or return tray conveyor run C.

Along the sloping run portion $C^2$ of the return tray conveyor run C there is provided at the left side of the oven a sloping guide track 104 and a sloping guide track 106 forwardly offset and parallel with respect to guide track 104. The left tray conveyor chain 40 is arranged to follow the rear guide track 104 and since the left rear corners of the trays are pivotally connected to the chain 40, the rear portions of the trays are constrained to follow the rear guide track 104. The left front corners of the trays being unattached to the chain 40, the outboard rollers 44 are free to follow the front guide track 106. The guide tracks 104 and 106 are suitably secured to the inner sheet of oven side wall 18. At the right side of the oven there are provided rear and front sloping guide tracks 108 and 110 transversely alined with the guide tracks 104 and 106 that are suitably secured to the inner sheet of oven side wall 20. The right tray conveyor chain 42 is arranged to follow the front guide track 110 and since the right front corners of the trays are pivotally connected to the chain 42, the front portions of the trays are constrained to follow the front guide track 110. The right rear corners of the trays being unattached to the chain 42, the outboard rollers 46 are free to follow the rear guide track 108. The guide tracks 108 and 110 are suitably secured to the inner sheet of oven side wall 20. The track 104 and 106 and the tracks 108 and 110 are offset a horizontal distance such that the trays 26 are maintained in horizontal position as they ascend the sloping run portion $C^2$.

Suitable longitudinally extending guide tracks 112 secured to the inner sheet of side wall 18 and similar guide tracks 114 secured to the inner sheet of side wall 20, are arranged to be engaged by tray conveyor chains 40 and 42 and by the tray outboard rollers 44 and 46 for supporting the trays as they traverse the run portion $C^1$ of the lower or return tray conveyor run C.

The relation of the longitudinal extent of tray conveyor run $C^1$ and the vertical extent of tray conveyor run $C^2$ with respect to the spacing of the trays 26 along the chains 40 and 42 is such that when a tray, as for example, tray 26A, is in a loading position at upright run A, a first succeeding tray 26B is disposed at the rearward end of run portion $C^1$, and a second succeeding tray 26C is between the upper and lower ends of run portion $C^2$ in substantial horizontal alinement with unloading conveyor 48 a distance below tray 26B to permit unloading rake 116 to pass therebetween as it engages and slidingly moves pans of proofed dough off the tray 26B onto the unloading conveyor 48.

The means for controlling the operation of the tray conveyor motor 66 includes a cam bank 118 suitably mounted at the right side of the oven between the inner and outer sheets of oven side wall 20. A sprocket chain 120 trained over a sprocket 122 fixed on through shaft 54 and a sprocket 124 fixed on the cam shaft 126 of cam bank 118 is arranged to rotate the cam shaft 126. The relation of the sprockets 122 and 124 is such as to rotate a cam 128 fixed on cam shaft 126 through one revolution for each advance of a tray 26 through one tray space. A switch S–1, FIGURE 2, is disposed with respect to cam 128 for actuation thereby each time a tray 26 arrives in its loading position, as exemplified by tray 26A, to stop tray conveyor motor 66. For this purpose, referring to FIGURE 8, switch S–1 is provided with a contact S–1b in circuit with tray conveyor motor 66, arranged under control of cam 128, FIGURE 2, to open when a tray, as exemplified by tray 26A, arrives in its loading position, breaking the circuit to motor 66 and interrupting operation of the tray conveyor. The motor 66 is arranged to be restarted by suitable reset timing means as, for example, the "Cycle-Flex Reset Timer" HP 5 Series, manufactured by Eagle Signal Division of E. W. Bliss Co., Davenport, Iowa, after a desired pause time during which pans are loaded onto a tray in the position shown occupied by tray 26A and pans are unloaded from a tray in the position shown occupied by tray 26C. Referring again to FIGURE 8, when contact S–1b of switch S–1 opens to stop tray conveyor motor 66, a second contact S–1a of switch S–1, in circuit with the reset timing means motor T–M, is arranged to close to start the reset timing means motor T–M. When the time for which the reset timing means has been set (sufficient to permit the tray 26A to be loaded and the tray 26C to be unloaded) expires, the reset timing means controlled switch T–S, in circuit with tray conveyor motor 66, is momentarily closed to restart tray conveyor motor 66. Operation of tray conveyor motor 66 again effects operation of the cam 128, as previously described, causing contact S–1a of switch S–1 controlling the reset timing means to re-open, resetting the same to its original condition, and causing contact S–1b of switch S–1 to re-close to maintain the tray conveyor motor 66 in operation until the next tray 26 reaches the loading position, whereupon the cycle is repeated.

The loading device includes a pair of laterally spaced generally rectangular compartments 130 and 132, made up of angle irons, plates and other suitable structural elements, disposed at and extending forwardly of the lower half of the oven front wall 16. Disposed between and supported by the compartments 130 and 132 is a pan supporting shelf 134, the shelf 134 and a tray in its loading position, as exemplified by tray 26A, being disposed in a common horizontal plane. The pan supporting shelf 134 includes a drop shelf portion 136 swingably mounted at its rearward end adjacent the oven loading opening 24 between a horizontal position as shown in full lines in FIGURES 1 and 3 and a vertical position adjacent the lower portion of oven front wall 16 as shown in phantom in FIGURE 3. The pan supporting shelf 134 preferably also includes comparatively narrow fixed pan supporting shelf portions 138 and 140 adjacent opposite sides of the drop shelf 136 as shown in FIGURE 2.

The means for swingably mounting the drop shelf 136 includes a pair of transversely extending tubular members 142 and 144 adjacent opposite sides of the rearward end portion of the drop shelf 136 rigidly secured in brackets 146 and 148 carried by the inner sides of compartments 130 and 132. The outer end portions of tubular members 142 and 144 project into the compartments 130 and 132. A transversely extending rock shaft 150 is rotatably mounted in the tubular members 142 and 144 and projects laterally outward of the ends of the tubular members 142 and 144. The drop shelf 136 includes a transversely extending rearward tubular member 152 through which extends the rock shaft 150. The tubular member 152 is secured, as by pins 154, to the rock shaft 150 whereby the drop shelf 136 may be swung to its horizontal or vertical position.

The means for retaining the drop shelf 136 in its horizontal pan supporting position includes a pair of elongated transversely extending brackets 156 and 158 adjacent opposite sides of the forward end portion of the drop shelf 136 rigidly secured to and projecting into the compartments 130 and 132. Transversely extending rods 160 and 162 are axially slidably mounted in suitable atlerally spaced bearings 164 secured to the brackets 156 and 158. Near its forward end, the drop shelf 136 includes a transversely extending forward tubular member 166, the ends of which are adapted to receive the inner ends of the axially slidable rods 160 and 162 to retain the drop shelf 136 in horizontal position. A suitable number of longitudinally extending laterally spaced rods 168 rigidly secured at their ends to the tubular members 152 and 166 complete the frame of the drop shelf 136. When it is desired to drop the drop shelf 136 to its phantom line position, it is only necessary for the operator to move the slidable rods 160 and 162 laterally outward out of engagement with tubular member 166. In order to cushion the downward swinging movement of the drop shelf 136, a torsion spring 170 is wound around the laterally outer projecting end of the rock shaft 150 in the compartment 130, one end of spring 170 abutting and being rigidly secured to a collar 172 which in turn is rigidly mounted on the rock shaft 150, and the other end of spring 170 abutting and being rigidly secured to a collar 174 which in turn is rigidly secured to the fixed tubular member 142. A similar spring arrangement, not shown, is provided at the opposite end of rock shaft 150 in the compartment 132.

The pan supporting shelf 134 also includes a pan supporting grid G formed by a plurality of longitudinally extending parallel laterally spaced wire rods 176 disposed in a common plane with the pan supporting surface of a tray when stopped in its loading position, as exemplified by tray 26A. The rearward ends of the wire rods 176 are turned downwardly as at 178 adjacent the front of the loading opening 24 and are secured to the tubular member 152 of the drop shelf 136 and to the tubular members 142 and 144 of the fixed pan supporting shelf portions 138 and 140. At their forward ends, the wire rods 176 are provided with depending reversely curved short rearwardly extending portions 180 which are secured to the tubular member 166 of the drop shelf 136 and to the brackets 156 and 158 of the fixed pan supporting shelf portions 138 and 140.

Extending rearward from the rearward ends of the drop shelf 136 and the fixed shelf portions 138 and 140 is an auxiliary pan supporting shelf 182 that terminates at its rearward end somewhat short of the forward end of the pan supporting surface of a tray in the position shown occupied by tray 26A. The auxiliary pan supporting shelf 182 is formed of wire rods 184 longitudinally alined with the wire rods 176 of the drop shelf 136 and the fixed shelf portions 138 and 140, which are secured to a suitable supporting structure as, for example, a conventional air curtain duct 186.

The loading device includes impelling means, indicated as a whole by reference numeral 188, operable to engage pans on the pan supporting shelf 134 and to push them across the pan supporting shelf 134 and the auxiliary pan supporting shelf 182 onto the pan supporting surface of successive trays 26 when in the position shown occupied by tray 26A. The impelling means 188 includes a pair of endless chains 190 and 192 disposed along opposite sides of and extending substantially the combined length of the pan supporting shelf 134 and auxiliary pan supporting shelf 182. The chains 190 and 192 are trained at their forward ends over sprockets 194 and 196 which are secured on stub shafts 198 and 200 journaled in suitable bearings carried by the inner sides of the compartments 130 and 132, and are trained at their rearward ends over sprockets 202 and 204 which are secured on stub shafts 206 and 208 journaled in suitable bearings carried by the inner sheets of oven side walls 18 and 20.

The pusher 210 of the loading device includes a transversely extending tubular member 212 connected at its ends, in a manner hereinafter described, to the chains 190 and 192. Rigidly secured on the tubular member 212 are a plurality of laterally spaced disks 214 arranged, when the tubular member 212 is being moved by the chains 190 and 192 along their upper runs, so that the lower peripheral portions of the disks 214 comb and extend below the level of the wire rods 176 and 184 to push pans thereacross onto an alined tray 26. Guide tracks 216 for the lower runs of the chains 190 and 192 depress the same a sufficient distance to permit the disks 214 to pass below the supports for the wire rods 176 and 184 when the tubular member 212 is being moved by the chains 190 and 192 along their lower runs.

In order to particularly adapt the loading device for loading shallow pans such as cooky sheets and bun pans, the forward end portions of the wire rods 176 are bent upwardly at a slight angle as at 218, the disks 214 are provided with a vertical chordal pushing face 220, and a distinctive linkage is provided for connecting the ends of the pusher tubular member 212 to the chains 190 and 192. The connection will be described with reference to chain 190, it being understood that the connection to chain 192 is the same in all respects, and will be described with reference to the pusher 210 in its home or rest position, at the rearward end of shelf 82.

Figure 6:
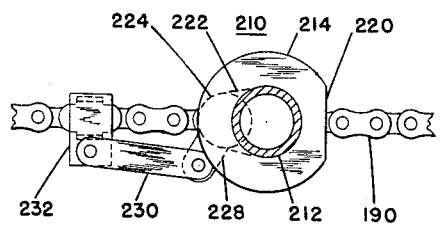
FIGURE 6 is an enlarged fragmentary sectional view of the loading pusher chain connection taken on line 6—6 of FIGURE 2.

The linkage includes a crank arm 222 secured to the end of the pusher tubular member 212 extending in a forward direction therefrom. A laterally outwardly projecting sleeve 224 is secured to the free end of the crank arm 222 so that the axis of the sleeve 224 is eccentrically disposed with respect to the axis of the tubular member 212. Rotatably mounted in the sleeve 224 is a pin 226, the projecting outer end of which is rigidly secured in any suitable manner to an inner side bar of the chain 190. Depending from the outer peripheral portion of the eccentric sleeve 224 is a lug 228 to the free end of which is pivotally attached one end of a link 230. The other end of link 230 is pivotally attached to the free end of a block 232 which is secured to and depends from an inner side bar of the chain 190 forward of the side bar to which the pin 226 is secured. Now, as the portion of chain 190 to which the pusher 210 is attached rounds the sprocket 202 from its upper run toward its lower run and while the block 232 is still on the upper run of the chain 190, the described linkage turns the tubular member 212 and consequently the disks in counterclockwise direction as viewed in FIGURE 6, to maintain the chordal pushing face 220 of the disks 214 in a vertical plane in wiping relation to the ends of the pans to thereby preclude catching and tilting of a shallow pan by the pusher 210 as the latter descends from the upper chain run toward the lower chain run.

In normal opeartion, the operator places the pans that are to be loaded on the horizontal portion of the wire rods 176 of the grid G adjacent the sloping portion 218 of the wire rods 176. In this position, even the shallowest of pans is engaged by the chordal pushing face 220 of the disks 214, since the entire linkage connecting the pusher 210 to the chain 190 will be disposed along the upper run of the chain 190. Prior to reaching this position and while the portion of chain 190 to which the block 232 of the linkage is approaching but has not reached the top run of the chain 190, the linkage raises the disks 214 above the plane of the horizontal portions of the grid wire rods 176. Therefore to prevent the front edge of a pan from being caught between the disks and the grid rods, should the operator place a pan on the grid with a portion thereof projecting forward of the horizontal grid portion, the forward ends of the rods 176 are, as previously described, sloped upwardly as at 218, whereby the lower peripheral portions of the disks 214 will project below the plane of the grid rods.

The drive means for the impelling means 188 of the loading pusher 210 includes a reduction gear head motor 234, suitably mounted in the compartment 132, as shown in FIGURE 4, and as also shown in phantom in FIG- URE 3. A sprocket chain 236 is trained over a sprocket 238 on the output shaft of the motor 234 and a sprocket 240 on one end of a through shaft 242 suitably journaled in bearings carried by the inner sheets of oven side walls 18 and 20, to drive the through shaft 242. The stub shafts 206 and 208 are driven from through shaft 242 by sprocket chains 244 and 246 trained around sprockets 248 and 250 fixed on opposite end portions of through shaft 242 and sprockets 252 and 254 fixed on stub shafts 206 and 208. The loading pusher 210 is arranged to be operated intermittently in timed relation, as hereinafter described, with operation of the oven tray conveyor. For this purpose, a cam 256 is fixed on the cam shaft 126 of the tray conveyor cam bank 118 and is arranged to momentarily close a switch S-2 in circuit with loading pusher motor 234, see FIGURES 2 and 8, to initiate operation of loading pusher 210 from its home or rest position at the rearward end of the auxiliary pan supporting shelf 182 sufficiently prior to arrival of a tray at its loading position, as exemplified by tray 26A, so that the loading pusher 210 will reach its pan engaging position, as shown in FIGURE 1, when a tray arrives at its loading position. The loading pusher 210 now pushes a row of pans onto an alined tray, as exemplified by tray 26A. Starting of loading pusher 210 by momentary closing of switch S-2, effects closing of switch S-3, FIGURES 4 and 8, as will become clear from the next following paragraph, to retain loading pusher motor 234 energized through the pushing stroke of the loading pusher 210 when switch S-2 re-opens.

Means, now to be described, is provided for stopping the loading pusher 210 at the end of its pushing stroke in its aforesaid home position. A cam 258 is fixed on a cam shaft 260 rotatably mounted in the compartment 130. The cam shaft 260 is operated from the stub shaft 198 of the impelling means 188 by a sprocket chain 262 trained over a small sprocket 264 fixed on stub shaft 198 and a large sprocket 266 fixed on the cam shaft 260. The relation of the sprockets 264 and 266 is such that the cam 258 makes one revolution for each cycle of operation of the loading pusher 210, and switch S-3 in circuit with the loading pusher motor 234 is disposed relative to the cam 258 to break the circuit to and stop motor 234 when the loading pusher 210 reaches its home position.

The unloading rake 116 includes a pair of longitudinally extending transversely spaced rake arms 268 and 270 connected at their rearward ends by a transversely extending rake bar 272, and a plurality of laterally spaced rake fingers 274 rigidly secured to and depending from the rake bar 272. The forward ends of the rake arms 268 and 270 carry outboard rollers 276 and 278 arranged to engage the under side of longitudinally extending tracks 280 and 282 to retain the forward end of the unloading rake 116 against upward displacement, and which rollers form a fulcrum about which the rake 116 is arranged to swing upwardly in a small arc from and downwardly to its horizontal position by means to be described. The rake 116 is arranged for reciprocatory movement in a forward or pan pushing direction in its horizontal position from a position wherein its rake fingers 274 are disposed adjacent the rearward end of a tray when in its unloading position, as exemplified by tray 26C, to a position wherein the rake fingers 274 are disposed adjacent the rearward end of the unloading conveyor 48, and in a rearward or return direction in its tilted position. As the rake 116 moves in its forward direction, the rake fingers 274 push a row of pans from the tray across a shelf 284 and onto the unloading conveyor 48.

The means for operating the rake 116 includes a pair of laterally spaced longitudinally extending endless chains 286 and 288 disposed in the forward end of the oven at an elevation above the unloading conveyor 48. Referring particularly to FIGURES 1 and 2, the chain 286 is trained at one end over a sprocket 290 and at its other end over a sprocket 292, the sprockets 290 and 292 being fixed on stub shafts 294 and 296 journaled in suitable bearings respectively carried by the inner side of compartment 130 and by the inner sheet of oven side wall 18. A similar mounting is provided for chain 288. The means connecting the chains 286 and 288 to the rake 116 includes blocks 298 and 300 rigidly secured to an inner side bar of the chains 286 and 288 and in which are rigidly secured laterally inwardly projecting pins 302 and 304. The free ends of the pins 302 and 304 are rotatably mounted in suitable bearings carried by the upper ends of brackets 306 and 308 that are rigidly secured to the rake arms 268 and 270 a short distance rearward of their rearward ends and project upwardly therefrom.

With the chains 286 and 288 operating in clockwise direction, as viewed in FIGURE 1, and as the portions thereof to which the pins 302 and 304 ae attached travel upwardly around front sprockets 290, at which time the rake 116 will be at the end of its pan pushing stroke, the rake 116 will be tilted upwardly about rollers 276 and 278 as a fulcrum. When the portions of chains 286 and 288, to which the pins 302 and 304 are attached, travel downwardly around rear sprockets 292 at the end of the return stroke of the rake 116, the rake 116 will return to its horizontal position.

Figure 3:
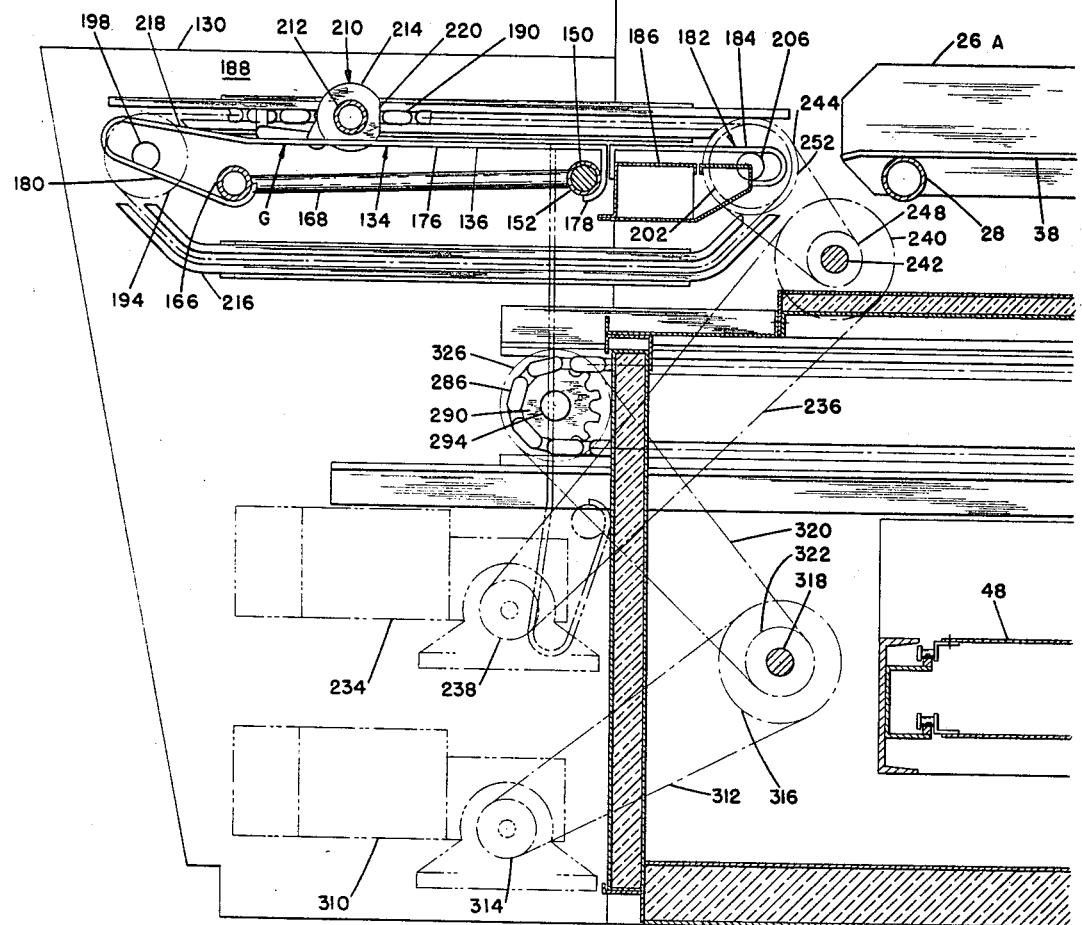
FIGURE 3 is an enlarged longitudinal vertical sectional view through the loader and a portion of the unloader as applied to the front of the oven, with the drive means at the near side of the oven being shown in phantom.

The drive means for the chains 286 and 288 includes a reduction gear head motor 310, suitably mounted in the compartment 132, as shown in FIGURE 4, and as also shown in phantom in FIGURE 3. A sprocket chain 312 is trained over a sprocket 314 on the output shaft of gear head reduction motor 310 and a sprocket 316 on one end of a through shaft 318 suitably journaled in bearings carried by the inner sheets of oven side walls 18 and 20, to drive the through shaft 318. The stub shafts 294 are driven from through shaft 318 by sprocket chains 320 trained around sprockets 322 and 324 fixed on opposite end portions of through shaft 318 and sprockets 326 and 327 fixed on the stub shafts 294. The unloading rake 116 is arranged to be operated intermittently in timed relation, as hereinafter described, with operation of the oven tray conveyor. For this purpose, a cam 328 is fixed on the cam shaft 126 of the tray conveyor cam bank 118 and is arranged to momentarily close a switch S-4 in circuit with unloading rake motor 310, to initiate operation of unloading rake 116 from its home or rest position, in which position the rake fingers 274 are disposed adjacent the rearward end of the unloading conveyor 48. The cam 328 and switch S-4 are so disposed to initiate operation of rake motor 310 prior to arrival of a tray in its unloading position and when the next preceding tray has been elevated a distance to permit the rake in its tilted position to pass thereunder and to reach its unloading position, as shown in FIGURE 1, when the approaching tray has reached its unloading position. The rake 116 now pushes a row of pans from the tray that is now stopped in its unloading position onto the unloading conveyor 48. Starting of unloading rake 116 by momentary closing of switch S-4, effects closing of switch S-5, FIGURES 4 and 8, as will become clear from the next following paragraph, to retain rake motor 310 energized through the unloading stroke of the rake 116 when switch S-4 re-opens.

Means, now to be described, is provided for stopping the unloading rake 116 at the end of its pan pushing stroke in its aforesaid home position. A cam 330 is fixed on a cam shaft 332 rotatably mounted in the compartment 130. The cam shaft 332 is operated from the stub shaft 294 by a sprocket chain 334 trained over a small sprocket 336 fixed on stub shaft 294 and a large sprocket 338 fixed on the cam shaft 332. The relation of the sprockets 336 and 338 is such that the cam 330 makes one revolution for each cycle of operation of the unloading rake 116 and switch S-5 in circuit with the unloading rake motor 310 is disposed relative to the cam 330 to break the circuit to and stop motor 310 when the unloading rake 116 reaches home position.

From the foregoing description it will be evident that there is provided an improved oven and level plane loading means therefor having a wide range of flexibility in expeditiously loading and unloading a variety of bakery products. With the drop shelf 136 in its horizontal position, the pans placed thereon by the operator are adapted to be mechanically loaded in a level plane onto successive trays 26 of the oven tray conveyor, and are adapted to be mechanically unloaded in a level plane by the unloading rake 116.

If this first product is to be followed by a product that is required to be or is preferably manually loaded and manually unloaded, as pies with a soft filling, the operator need only drop the drop shelf 136 in the manner previously described. He can now stand in the space previously occupied by the drop shelf 136 and can very easily reach and load the pans directly onto the trays 26 of the oven tray conveyor. To manually load pans directly onto the trays 26 of the oven tray conveyor, the operator need only press a conventional stop-start switch 340 in circuit with the loader motor 234 to stop the loading pusher 210, when the latter is at the forward end of its return path to provide the unobstructed above mentioned space in which the operator can stand when he drops the drop shelf 136, as above described. Furthermore, he need not wait until the oven has been cleared of the first product since the mechanical unloader can be continued in operation to mechanically unload the first product while he is manually loading the second product. When the last tray of the first product has been mechanically unloaded, the operator need only press stop-start switch 342 in circuit with the unloader motor 310 to stop the unloading rake 116 when it has reached its home position. With the unloading rake 116 now rendered inoperative, the second product can now be unloaded manually when the trays reach the loading opening 24. The trays 26, as before described, stop in this position, and while in such stopped position, the operator can unload a tray, placing the pans of baked products on a near at hand rack, and then from a second or the same rack he can manually load the now empty tray with pans of product to be baked. Manual loading and unloading can thus be performed by a single operator.

If this second product is to be followed by a third product that is required to be or is preferably manually loaded, but when baked can be mechanically unloaded, the operator need only re-close the stop-start switch 342 to the unloading motor 310, to start the unloader rake when the last tray of the second product has passed the mechanically unload position. While the different products are described above as being loaded and unloaded in one certain sequence, it will be apparent that they can be loaded and unloaded in any desired sequence.

With the pusher 210 disposed beneath the pan supporting shelf 134 as it travels from its home position along the lower runs of chains 190 and 192 to the forward end of pan supporting shelf 134, it is apparent that the operator can even during such operation place pans on the pan supporting shelf 134. Furthermore, since the pusher 210 moves upwardly around the forward end of the pan supporting shelf 134, the pusher 210 will merely push the arms or hands of the operator out of the way, thereby eliminating the hazard of having his arms or hands caught between the pusher and the pan supporting shelf, as in the case of pushers that move downwardly around the forward end of the pan supporting shelf.

In addition, as previously described, the loading device is particularly adapted for loading even the shallowest of pans without catching and tipping the pans at any time during the pushing stroke of the pusher 210.

While the invention has been shown and described with respect to one embodiment thereof, it will be readily apparent to those skilled in the art, that various changes and modifications may be made without departing from the spirit and scope of the invention.

We claim:

1. In a baking oven provided with an opening in the front wall thereof;
   an endless tray conveyor in said oven having equidistantly spaced apart trays movable upwardly along a generally vertical run adjacent said opening, rearwardly from said vertical run along a longitudinal upper run and forwardly along a longitudinal lower run to the lower end of said vertical run forming part of an endless circuit;
   a horizontal pan loading shelf outside said oven and projecting through said opening toward said vertical run;
   a loading pusher movable in a path across said pan loading shelf from the forward to the rearward end thereof for pushing pans from said pan loading shelf onto an alined tray of said tray conveyor;
   said pan loading shelf including a portion outside said oven pivotally mounted adjacent said oven front wall about a horizontal transversely extending axis for swinging movement between its horizontal position and a vertical position against said oven front wall;
   a horizontal pan receiving surface disposed in the lower forward portion of said oven;
   unloading means for moving pans from a second tray disposed in said lower tray conveyor run onto said pan receiving surface when a first tray is in alinement with said pan loading shelf;
   a motor for operating said loading pusher and a motor for independently operating said unloading means whereby to permit selective simultaneous mechanical loading and unloading of two separate trays when both of said motors are energized, manual loading and mechanical unloading two separate trays when said shelf is in said vertical position and said loading pusher motor is de-energized, and manual loading and unloading of the same tray when said motors are both de-energized and the shelf is in vertical position.

2. Apparatus in accordance with claim 1 including a motor for operating said tray conveyor and means for de-energizing said tray conveyor motor for a timed interval each time a tray is in alinement with said pan loading shelf.

3. In a baking oven provided with an opening in the front wall thereof;
   an endless tray conveyor in said oven having equidistantly spaced apart trays movable upwardly along a generally vertical run adjacent said opening, rearwardly from said vertical run along a longitudinal upper run and forwardly along a longitudinal lower run to the lower end of said vertical run forming part of an endless circuit;
   a horizontal pan loading shelf outside said oven and projecting through said opening toward said vertical run;
   a loading pusher movable in a path across said pan loading shelf from the forward to the rearward end thereof for pushing pans from said pan loading shelf onto an alined tray of said tray conveyor;
   said pan loading shelf including a portion outside said oven pivotally mounted adjacent said oven front wall about a horizontal transversely extending axis for swinging movement between its horizontal position and a vertical position against said oven front wall;
   disconnectible means at the forward end of said swingable shelf portion for supporting it in said horizontal position;
   a horizontal pan receiving surface disposed in the lower forward portion of said oven in spaced relation below said vertical tray conveyor run;
   unloading means for transferring pans from a second tray disposed in said lower tray conveyor run onto said pan receiving surface when a first tray is in alinement with said pan loading shelf; and
   a motor for operating said loading pusher and a motor for independently operating said unloading means whereby to provide for simultaneous mechanical loading and unloading of said first and second trays when said motors are energized and said swingable shelf portion is in its horizontal position, manual loading of said first tray and mechanical loading of said second tray said loading pusher motor is de-energized and said swingable shelf portion is in its vertical position against said oven front wall, and manual unloading and loading through said opening of the same tray when said loading pusher and unloading means motors are de-energized and said swingable shelf portion is in its vertical position against said oven front wall; and means for intermittently operating said endless tray conveyor to advance said trays a tray space at a time.

4. In a baking oven provided with an opening in the front wall thereof;
an endless tray conveyor in said oven having equidistantly spaced apart trays movable upwardly along a generally vertical run adjacent said opening, rearwardly from said vertical run along a longitudinal upper run and forwardly along a longitudinal lower run to the lower end of said vertical run forming part of an endless circuit;
said longitudinally extending lower run including a horizontal run portion adjacent said vertical run and a downwardly extending run portion adjacent the rearward end of said horizontal run portion;
said horizontal and downwardly extending run portions forming with said oven front wall and the bottom of said oven a space accommodating a horizontal pan receiving surface disposed adjacent said downwardly extending run portion in spaced relation below said horizontal run portion;
the longitudinal extent of said horizontal run portion and the vertical extent of said downwardly extending run portion and the spacing of said trays being such that when a tray is at the said vertical run portion, a first succeeding tray is at the rearward end of said horizontal run portion and a second succeeding tray is along said downwardly extending run portion in alinement with said pan receiving surface;
a reciprocatably mounted pusher movable across a tray alined with said pan receiving surface for pushing pans from successively alined trays onto said pan receiving surface; and
means for actuating said pusher and said tray conveyor.

5. Apparatus is accordance with claim 4 wherein the actuating means for said pusher includes endless drive means disposed in said space below said horizontal run portion and above said pan receiving surface, and means connecting said endless drive means with said pusher.

6. In a baking oven provided with an opening in the front wall thereof;
an endless tray conveyor in said oven having equidistantly spaced apart trays movable upwardly along a generally vertical run adjacent said opening, rearwardly from said vertical run along a longitudinal upper run and forwardly along a longitudinal lower run to the lower end of said vertical run forming part of an endless circuit;
said longitudinally extending lower run including a horizontal run portion adjacent said vertical run and a downwardly extending run portion adjacent the rearward end of said horizontal run portion;
a horizontal pan loading shelf outside said oven and projecting through said opening toward said vertical run;
a loading pusher movable in a path across said pan loading shelf from the forward to the rearward end thereof for pushing pans from said pan loading shelf into an alined tray of said tray conveyor;
said pan loading shelf including a portion outside said oven pivotally mounted adjacent said oven front wall about a horizontal tranversely extending axis for downward swinging movement from its horizontal position to a vertical position against said over front wall;
said horizontal and downwardly extending tray conveyor run portions forming with said oven front wall and the bottom of said oven a space accommodating a horizontal pan receiving surface disposed adjacent said downwardly extending run portion in spaced relation below said horizontal run portion;
the longitudinal extent of said horizontal run portion and the vertical extent of said downwardly extending run portion and the spacing of said trays being such that when a tray is at the said vertical run portion in alignment with said pan loading shelf, a first succeeding tray is at the rearward end of said horizontal run portion and a second succeeding tray is along said downwardly extending run portion in alignment with said pan receiving surface;
a reciprocatably mounted unloading pusher movable across a tray alined with said pan receiving surface for pushing pans from an alined tray onto said pan receiving surface; and
means for actuating said tray conveyor and said pushers.

7. Apparatus in accordance with claim 6 wherein the actuating means for said unloading pusher includes endless drive means disposed in said space below said horizontal run portion and above said pan receiving surface, and means connecting said endless drive means with said unloading pusher.

8. A loading device for baking oven provided with a transversely elongated opening in the front wall thereof;
said loading device including a substantially horizontally disposed pan loading shelf including a forward portion outside said oven front wall and a rearward portion extending through said opening into the oven;
said pan loading shelf being formed by a plurality of laterally spaced longitudinally extending rods;
an endless driven member at each side of and substantially co-extensive with said pan loading shelf including a rearwardly traveling upper run, a forwardly traveling lower run and curvilinear connecting end runs;
a transversely extending pusher member connected at its ends to said endless drive members;
said pusher member including a plurality of laterally spaced pushing discs disposed between the longitudinal vertical planes of said rods;
the upper run of said endless driven members being disposed a distance above the plane of said pan loading shelf such that the lower peripheral portions of said discs comb said rods for pushing pans thereacross into said oven; and
the lower run of said endless driven members being disposed a distance below the plane of said pan loading shelf such that said discs on their return run are below the plane of said pan loading shelf.

9. A loading device in accordance with claim 8 wherein said discs have a chordal pushing face disposed in a vertical plane and extending substantially to the plane of said pan loading shelf as said pusher member is moved by said endless driven members along their upper run.

10. A loading device in accordance with claim 8 wherein the connection between the ends of said pusher member and said endless driven members includes articulated linkage means for retaining said chordal pushing face in a vertical plane during an initial portion of the travel of said discs around the curvilinear run connecting the rearward ends of the upper and lower runs of said endless driven members.

11. A loading device in accordance with claim 8 wherein the connection between the ends of said pusher member includes means mounting said pusher member for rotation relative to said endless driven members, a link disposed in a longitudinal vertical plane offset inwardly of the loops of each of said endless driven members, means pivotally connecting the leading end of each of said links with opposite ends of said rotatably mounted pusher member and means pivotally connecting the trailing end of each of said links with a respective endless driven member.

12. In a baking oven provided with a transversely elongated opening in the front wall thereof;
   longitudinally extending endless driven means in said oven;
   pan supporting means carried by said endless driven means for movement in a closed circuit including a run portion adjacent said opening;
   a pair of laterally spaced frames at opposite sides of said opening extending in a forward direction from said front wall;
   a substantially horizontally disposed pan loading shelf including a forward portion outside said oven between said frames pivotally mounted adjacent said front wall for downward swinging movement about a horizontal transversely extending axis from its horizontal position to a vertical position against said oven front wall, and including a fixed rearward portion extending through said opening into the oven adjacent said run portion;
   an endless driven member laterally outward of each side of and coextensive with said pan loading shelf supported in part at least by said laterally spaced frames;
   a transversely extending pusher member connected at its ends to said endless driven members for movement thereby across said pan loading shelf from the forward to the rearward end thereof to push pans from said pan loading shelf onto the pan supporting means in said oven;
   manually operable quick release means supporting said pivotally mounted shelf in said horizontal position by said laterally spaced frames for pushing of pans thereacross by said pusher member;
   means for immobilizing said pusher member in a position subjacent the forward end of said pan loading shelf to provide upon release of said pivotally mounted shelf to its vertical position an unobstructed space between said laterally spaced frames for manual loading of pans through said opening directly on said pan supporting means in said oven.

References Cited
UNITED STATES PATENTS

| | | | |
|---|---|---|---|
| 2,931,322 | 4/1960 | Royer | 107—57 |
| 2,980,038 | 4/1961 | Royer | 107—57 |

WALTER A. SCHEEL, *Primary Examiner.*

JOSEPH SHEA, *Assistant Examiner.*